(12) United States Patent
Kato et al.

(10) Patent No.: US 10,550,897 B2
(45) Date of Patent: Feb. 4, 2020

(54) DRIVING FORCE TRANSMISSION CONTROL APPARATUS

(71) Applicant: JTEKT CORPORATION, Osaka-shi (JP)

(72) Inventors: Tomoaki Kato, Kariya (JP); Kotaro Sarai, Nishio (JP); Go Nagayama, Toyama (JP); Toshimi Hara, Takahama (JP); Naoki Sawada, Handa (JP); Masahito Uesaka, Anjo (JP); Yasunari Saito, Chiryu (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/123,794

(22) Filed: Sep. 6, 2018

(65) Prior Publication Data
US 2019/0072137 A1 Mar. 7, 2019

(30) Foreign Application Priority Data

Sep. 6, 2017 (JP) .................................. 2017-171094

(51) Int. Cl.
*F16D 48/06* (2006.01)
*F16D 27/115* (2006.01)
(Continued)

(52) U.S. Cl.
CPC ............ *F16D 27/115* (2013.01); *B60K 17/02* (2013.01); *B60K 23/0808* (2013.01);
(Continued)

(58) Field of Classification Search
CPC ................... F16D 48/06; F16D 48/064; F16D 2500/1022; F16D 2500/3022;
(Continued)

(56) References Cited

U.S. PATENT DOCUMENTS

| 2012/0322618 A1* | 12/2012 | Reibold | ................... F16D 48/06 |
| | | | 477/180 |
| 2013/0062154 A1* | 3/2013 | Burns | ................ B60K 23/0808 |
| | | | 192/84.1 |
| 2014/0136124 A1* | 5/2014 | Maroonian | ............... G01L 3/00 |
| | | | 702/41 |

FOREIGN PATENT DOCUMENTS

JP      2007-64251      3/2007

* cited by examiner

*Primary Examiner* — Edwin A Young
(74) *Attorney, Agent, or Firm* — Oblon, McClelland, Maier & Neustadt, L.L.P.

(57) ABSTRACT

A driving force transmission control apparatus includes: a driving force transmission device that includes an electromagnetic clutch mechanism configured to generate a frictional force between clutch plates by energization of an electromagnetic coil and transmits a driving force by actuating the electromagnetic clutch mechanism; and a control device that controls the driving force transmission device. The control device includes a storage unit storing a hysteresis value representing the difference between a current value required to transmit a predetermined torque when an energization current to the electromagnetic coil is gradually increased and a current value required to transmit the predetermined torque when the energization current is gradually reduced, a torque command value calculator that calculates a torque command value, and a current command value calculator that calculates a current command value representing a target value of a current to be supplied to the electromagnetic coil based on the torque command value and the hysteresis value.

5 Claims, 6 Drawing Sheets

(51) Int. Cl.
*B60K 17/02* (2006.01)
*B60K 23/08* (2006.01)
*F16D 13/52* (2006.01)

(52) U.S. Cl.
CPC ........... *F16D 13/52* (2013.01); *F16D 48/064* (2013.01); *F16D 2500/1022* (2013.01); *F16D 2500/1045* (2013.01); *F16D 2500/10431* (2013.01); *F16D 2500/3022* (2013.01); *F16D 2500/50287* (2013.01); *F16D 2500/7044* (2013.01); *F16D 2500/7061* (2013.01); *F16D 2500/70418* (2013.01)

(58) Field of Classification Search
CPC . F16D 2500/50287; F16D 2500/70418; F16D 2500/7061
See application file for complete search history.

DRIVING FORCE TRANSMISSION CONTROL APPARATUS

INCORPORATION BY REFERENCE

The disclosure of Japanese Patent Application No. 2017-171094 filed on Sep. 6, 2017 including the specification, drawings and abstract, is incorporated herein by reference in its entirety.

BACKGROUND OF THE INVENTION

1. Field of the Invention

The present invention relates to a driving force transmission control apparatus including a driving force transmission device that transmits a driving force between an input-side rotary member and an output-side rotary member by actuating an electromagnetic clutch mechanism, and a control device that controls the driving force transmission device.

2. Description of Related Art

There are four-wheel-drive vehicles including main drive wheels and auxiliary drive wheels and capable of switching between a two-wheel drive mode in which the driving force of a driving source is transmitted only to the main drive wheels and a four-wheel drive mode in which the driving force of the driving source is transmitted to the main drive wheels and the auxiliary drive wheels. Conventionally, such a four-wheel drive vehicle includes a driving force transmission device capable of adjusting a driving force that is transmitted to the auxiliary drive wheels. See, for example, Japanese Patent Application Publication No. 2007-64251 (JP 2007-64251 A).

A driving force transmission device disclosed in JP 2007-64251 A includes an outer case and an inner shaft that are coaxially and relatively rotatable, a main clutch unit disposed between the outer case and the inner shaft, a cam mechanism that generates a thrust force for pressing the main clutch unit through relative rotation of two cam members, and a pilot clutch unit that transmits a rotational force to one of the two cam members so as to rotate the one of the cam members relative to the other one of the cam members. The pilot clutch unit is configured as an electromagnetic clutch mechanism including an electromagnetic coil to which a current is suppled from a control device, a yoke holding the electromagnetic coil, a plurality of clutch plates, an armature facing the electromagnetic coil with the plurality of clutch plates interposed therebetween.

When a current is supplied from the control device to the electromagnetic coil, the two cam members of the cam mechanism are rotated relative to each other by a rotational force transmitted by the pilot clutch unit. The main clutch unit is pressed with a thrust force generated by the relative rotation, so that a driving force is transmitted from the outer case to the inner shaft.

The control device stores I-T characteristics measured after assembly of the driving force transmission device to be controlled and indicating the relationship between current supplied to the electromagnetic coil and the magnitude of torque output from the driving force transmission device, and adjusts the current supplied to the electromagnetic coil based on the I-T characteristics so as to cause a required driving force to be transmitted to the auxiliary drive wheels.

According to the driving force transmission device with the configuration described above, due to the magnetic hysteresis of the yoke and armature each made of a magnetic material, even when the same current is supplied to the electromagnetic coil, the driving force transmitted by the driving force transmission device varies depending on whether the current supplied is increasing or decreasing. Therefore, even when the current to be supplied to the electromagnetic coil is adjusted based on the I-T characteristics measured after assembly of the driving force transmission device, a desired driving force is often not transmitted to the auxiliary drive wheels.

SUMMARY OF THE INVENTION

An object of the present invention is to provide a driving force transmission control apparatus that can improve the accuracy of the driving force transmitted by a driving force transmission device.

According to an aspect of the present invention, there is provided a driving force transmission control apparatus including:
  a driving force transmission device that includes an electromagnetic clutch mechanism and transmits a driving force between an input-side rotary member and an output-side rotary member by actuating the electromagnetic clutch mechanism, the electromagnetic clutch mechanism being configured to attract an armature toward a yoke by a magnetic force generated by energization of an electromagnetic coil held by the yoke and generate a frictional force between a plurality of clutch plates by moving the armature; and
  a control device that controls the driving force transmission device;
  wherein the control device includes
    a storage unit that stores a hysteresis value representing a difference between a current value required to transmit a predetermined driving force between the rotary members when an energization current to the electromagnetic coil is gradually increased and a current value required to transmit the predetermined driving force between the rotary members when the energization current is gradually reduced,
    a torque command value calculator that calculates a torque command value representing a target value of a driving force to be transmitted from the input-side rotary member to the output-side rotary member,
    a current command value calculator that calculates a current command value representing a target value of a current to be supplied to the electromagnetic coil, based on the torque command value and the hysteresis value, and
    a current control unit that performs current feedback control to supply a current corresponding to the current command value to the electromagnetic coil.

With the driving force transmission control apparatus according to the above aspect, the accuracy of the driving force transmitted by the driving force transmission device can be improved.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention will be described with reference to FIGS. 1 to 6.

Figure 1:
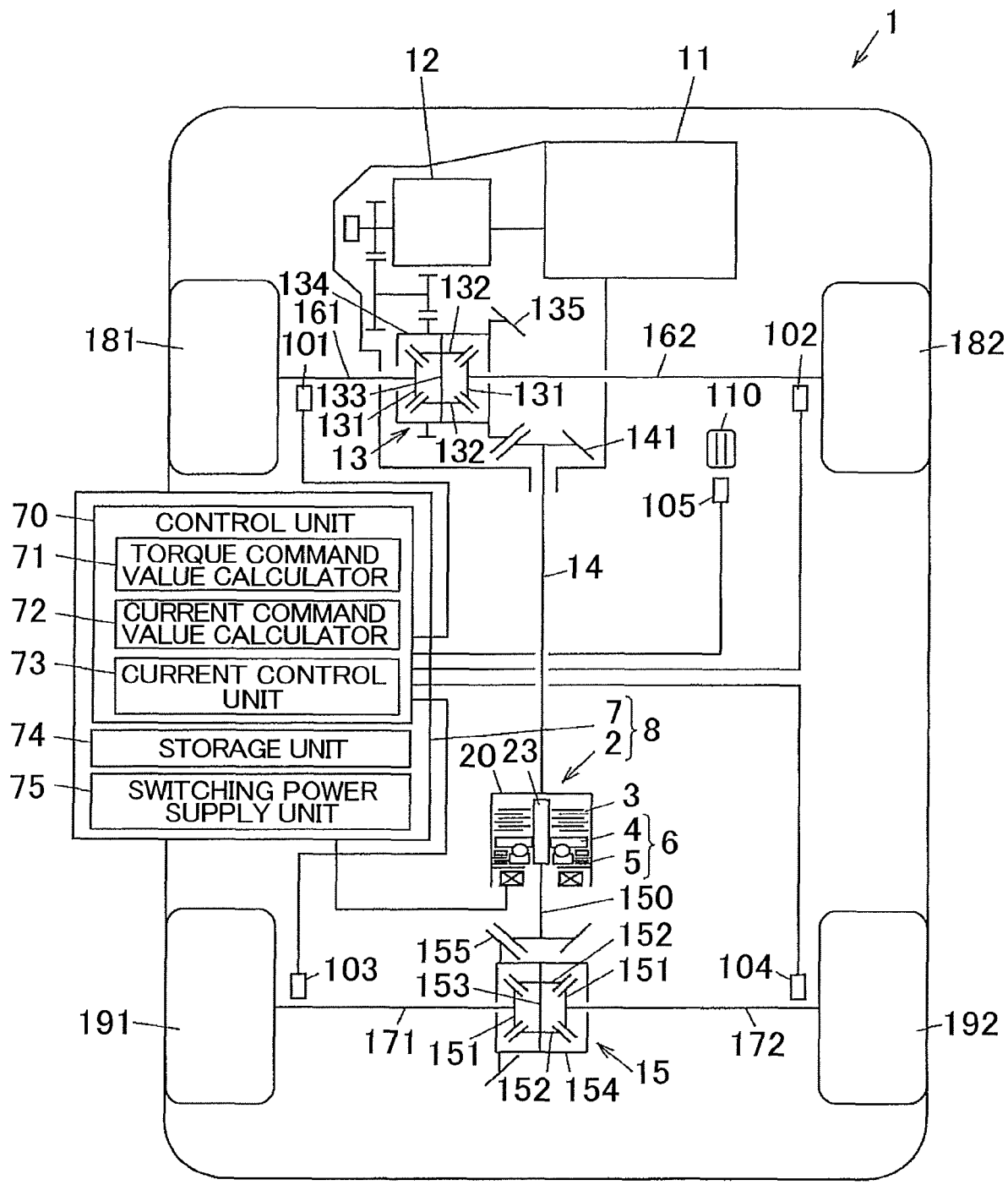
FIG. 1 is a schematic configuration diagram illustrating an example of the configuration of a four-wheel drive vehicle including a control device for a driving force transmission device according to an embodiment of the present invention.

FIG. 1 is a schematic configuration diagram illustrating an example of the configuration of a four-wheel drive vehicle including a control device for a driving force transmission device according to an embodiment of the present invention. As illustrated in FIG. 1, a four-wheel drive vehicle 1 includes an engine 11 serving as a driving source that generates a driving force in accordance with the operation amount of an accelerator pedal 110 (accelerator operation amount), a transmission 12 that changes the output speed of the engine 11, right and left front wheels 182 and 181 serving as main drive wheels to which the driving force of the engine 11 with a speed changed by the transmission 12 is constantly transmitted, and right and left rear wheels 192 and 191 serving as auxiliary drive wheels to which the driving force of the engine 11 is transmitted in accordance with the traveling state of the four-wheel drive vehicle 1. Wheel speed sensors 101 to 104 are provided for the right and left front wheels 182 and 181 and the right and left rear wheels 192 and 191.

The four-wheel drive vehicle 1 further includes a front differential 13, a propeller shaft 14, a rear differential 15, a pinion gear shaft 150 that transmits a driving force to the rear differential 15, right and left front-wheel drive shafts 162 and 161, right and left rear-wheel drive shafts 172 and 171, a driving force transmission device 2 disposed between the propeller shaft 14 and the pinion gear shaft 150, and a control device 7 that controls the driving force transmission device 2. The driving force transmission device 2 and the control device 7 form a driving force transmission control apparatus 8.

The driving force transmission device 2 transmits a driving force from the propeller shaft 14 to the pinion gear shaft 150, in accordance with a current supplied from the control device 7. The driving force of the engine 11 is transmitted to the right and left rear wheels 192 and 191 via the driving force transmission device 2. The control device 7 can obtain wheel speed signals detected by the wheel speed sensors 101 to 104 and indicating the rotational speeds of the right and left front wheels 182 and 181 and the right and left rear wheels 192 and 191, and an accelerator operation amount signal detected by an accelerator pedal sensor 105 and indicating the operation amount of the accelerator pedal 110. The control device 7 supplies a current to the driving force transmission device 2, thereby controlling the driving force transmission device 2.

The driving force of the engine 11 is transmitted to the right and left front wheels 182 and 181 via the transmission 12, the front differential 13, and the right and left front-wheel drive shafts 162 and 161. The front differential 13 includes a pair of side gears 131 that are respectively coupled to the right and left front-wheel drive shafts 162 and 161 so as not to be rotatable relative thereto, a pair of pinion gears 132 that meshes with the pair of side gears 131 such that the gear axes of the pinion gears 132 are orthogonal to the gear axes of the side gears 131, a pinion gear shaft 133 supporting the pinion gears 132, and a front differential case 134 that houses these components.

A ring gear 135 is fixed to the front differential case 134. The ring gear 135 meshes with a pinion gear 141 disposed at an end of the propeller shaft 14 on the front side of the vehicle. Another end of the propeller shaft 14 on the rear side of the vehicle is coupled to a housing 20 of the driving force transmission device 2. The driving force transmission device 2 includes an inner shaft 23 disposed to be rotatable relative to the housing 20. The pinion gear shaft 150 is coupled to the inner shaft 23 so as not to be rotatable relative thereto. The driving force transmission device 2 will be described in detail below.

The rear differential 15 includes a pair of side gears 151 that are respectively coupled to the right and left rear-wheel drive shafts 172 and 171 so as not to be rotatable relative thereto, a pair of pinion gears 152 that meshes with the pair of side gears 151 such that the gear axes of the pinion gears 152 are orthogonal to the gear axes of the side gears 151, a pinion gear shaft 153 supporting the pinion gears 152, a rear differential case 154 that houses these components, and a ring gear 155 that is fixed to the rear differential case 154 and meshes with the pinion gear shaft 150.

Figure 2:
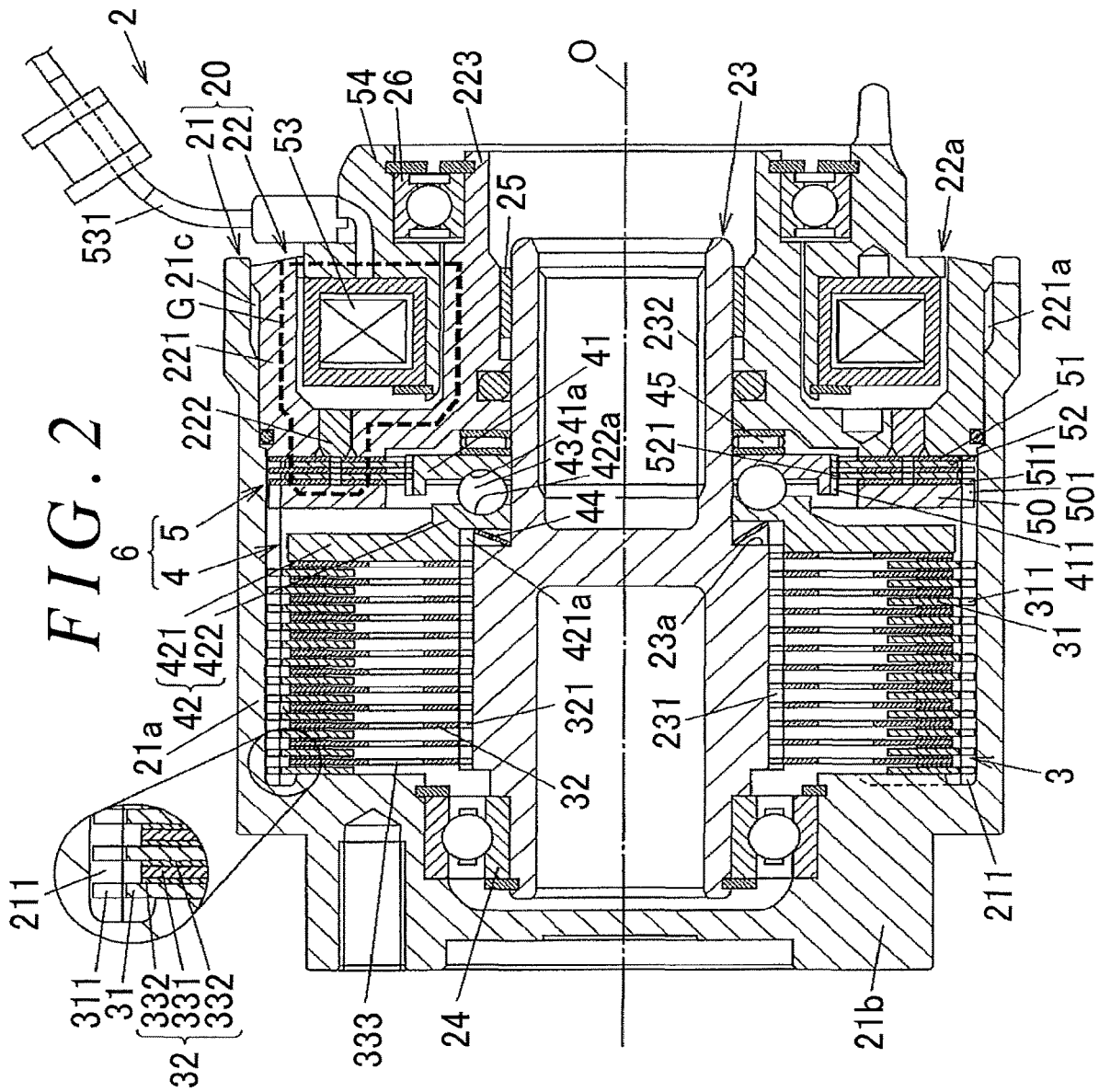
FIG. 2 is a cross-sectional view illustrating an example of the configuration of the driving force transmission device.

FIG. 2 is a cross-sectional view illustrating an example of the configuration of the driving force transmission device 2. In FIG. 2, the driving force transmission device 2 in an operating state (state in which torque is transmitted) is illustrated on the upper side of a rotation axis O, and the driving force transmission device 2 in a non-operating state (state in which torque is not transmitted) is illustrated on the lower side of the rotation axis O. Hereinafter, a direction parallel to the rotation axis O will be referred to as an axial direction.

The driving force transmission device 2 includes the housing 20 including a front housing 21 and a rear housing 22, the inner shaft 23 having a tubular shape and supported coaxially with the housing 20 so as to be rotatable relative thereto, a main clutch 3 disposed between the housing 20 and the inner shaft 23, a cam mechanism 4 that generates a thrust force for pressing the main clutch 3, and an electromagnetic clutch mechanism 5 that is supplied with a current from the control device 7 and operates the cam mechanism 4. The cam mechanism 4 and the electromagnetic clutch mechanism 5 form an actuator 6 that generates a pressing force for pressing the main clutch 3 in accordance with the current supplied from the control device 7. The housing 20 is an example of an input-side rotary member of the present invention, and the inner shaft 23 is an output-side rotary member of the present invention. Lubricating oil (not illustrated) is sealed inside the housing 20.

The front housing 21 includes, as integral parts, a cylindrical tubular portion 21a and a bottom portion 21b, and thus has a bottomed cylindrical shape. The tubular portion 21a has an internal thread 21c on the inner surface at its opening end. The propeller shaft 14 (see FIG. 1) is coupled to the bottom portion 21b of the front housing 21 via, for example, a cross joint. The front housing 21 includes a plurality of outer spline projections 211 extending in the axial direction on the inner peripheral surface of the tubular portion 21a.

The rear housing 22 includes a first annular member 221 made of a magnetic martial, such as iron, a second annular member 222 that is made of a non-magnetic material, such as austenitic stainless steel, and that is joined to the inner periphery of the first annular member 221 by welding or the like, and a third annular member 223 that is made of a magnetic material, such as iron, and that is joined to the inner periphery of the second annular member 222 by welding or the like. An annular accommodation space 22a that accommodates an electromagnetic coil 53 is formed between the first annular member 221 and the third annular member 223. The first annular member 221 has, on its outer peripheral surface, an external thread 221a that is threaded in the internal thread 21c of the front housing 21.

The inner shaft 23 is supported on the inner periphery side of the housing 20 by a ball bearing 24 and a needle roller bearing 25. The inner shaft 23 includes a plurality of inner spline projections 231 extending in the axial direction on the outer peripheral surface thereof. The inner shaft 23 has, on the inner surface at an end thereof, a spline fitting portion 232 to which an end of the pinion gear shaft 150 (see FIG. 1) is fitted so as not to be rotatable relative to the inner shaft 23.

The main clutch 3 includes a plurality of main outer clutch plates 31 and a plurality of main inner clutch plates 32 that are arranged alternately in the axial direction. The main outer clutch plates 31 rotate with the front housing 21, whereas the main inner clutch plates 32 rotate with the inner shaft 23. Each main outer clutch plate 31 has, at its outer peripheral edge, a plurality of engagement projections 311 that engage with the outer spline projections 211 of the front housing 21. The engagement projections 311 engage with the outer spline projections 211 and the main outer clutch plate 31 is restricted from rotating relative to the front housing 21 while being allowed to move in the axial direction relative to the front housing 21.

Each main inner clutch plate 32 has, at its inner peripheral edge, a plurality of engagement projections 321 that engage with the inner spline projections 231 of the inner shaft 23. When the engagement projections 321 engage with the inner spline projections 231, the main inner clutch plate 32 is restricted from rotating relative to the inner shaft 23 while being allowed to move in the axial direction relative to the inner shaft 23. Each main inner clutch plate 32 further includes a disc-shaped substrate 331 made of metal, and friction materials 332 attached to the opposite sides of the substrate 331. The substrate 331 has a plurality of oil holes 333 for communication of lubricating oil on the inner side with respect to the portion where the friction materials 332 are attached. Each main inner clutch plate 32 has an oil groove (not illustrated) through which the lubrication oil flows, in its contact surface with the friction material 332.

The cam mechanism 4 includes a pilot cam 41 that receives a rotational force of the housing 20 via the electromagnetic clutch mechanism 5, a main cam 42 serving as a pressing member that presses the main clutch 3 in the axial direction, and a plurality of spherical cam balls 43 disposed between the pilot cam 41 and the main cam 42.

The main cam 42 includes, as integral parts, an annular disc-shaped pressing portion 421 that contacts the main inner clutch plate 32 at one end of the main clutch 3 to press the main clutch 3, and a cam portion 422 disposed on the inner peripheral side of the main cam 42 with respect to the pressing portion 421. A spline engagement portion 421a provided at an inner peripheral end of the pressing portion 421 engages with the inner spline projections 231 of the inner shaft 23 and the main cam 42 is restricted from rotating relative to the inner shaft 23. The main cam 42 is urged away from the main clutch 3 in the axial direction by a disc spring 44 disposed between the main cam 42 and a stepped surface 23a of the inner shaft 23.

The pilot cam 41 has, at its outer peripheral edge, a spline projection 411. The spline projection 411 receives, from the electromagnetic clutch mechanism 5, a rotational force for rotating the pilot cam 41 relative to the main cam 42. A thrust needle roller bearing 45 is disposed between the pilot cam 41 and the third annular member 223 of the rear housing 22. The pilot cam 41 has a plurality of cam grooves 41a in its surface facing the cam portion 422 of the main cam 42, and the cam portion 422 of the main cam 42 has a plurality of cam grooves 422a in its surface facing the pilot cam 41. The axial depth of each of the cam grooves 41a and the cam grooves 422a varies in the circumferential direction. The cam balls 43 are disposed between the cam grooves 41a of the pilot cam 41 and the cam grooves 422a of the main cam 42.

When the pilot cam 41 rotates relative to the main cam 42, the cam mechanism 4 generates a pressing force for pressing the main clutch 3. When the main clutch 3 receives the pressing force from the cam mechanism 4, the main outer clutch plates 31 and the main inner clutch plates 32 of the main clutch 3 come into frictional contact with each other. The main clutch 3 thus transmits a driving force, by a frictional force generated between the main outer clutch plates 31 and the main inner clutch plates 32.

The electromagnetic clutch mechanism 5 includes an armature 50, a plurality of pilot outer clutch plates 51, a plurality of pilot inner clutch plates 52, the electromagnetic coil 53, and an annular yoke 54 made of a magnetic material and holding the electromagnetic coil 53. The electromagnetic coil 53 is held by the yoke 54, and is accommodated in the accommodation space 22a of the rear housing 22. The yoke 54 is supported by the third annular member 223 of the rear housing 22 via a ball bearing 26. The yoke 54 has an outer peripheral surface facing an inner peripheral surface of the first annular member 221. The yoke 54 has an inner peripheral surface facing an outer peripheral surface of the third annular member 223.

A control current is supplied as a coil current from the control device 7 to the electromagnetic coil 53 via an electrical wire 531. When the electromagnetic coil 53 is energized, magnetic flux is generated in a magnetic path G illustrated in FIG. 2. The yoke 54, the first annular member 221 and the third annular member 223 of the rear housing 22, the plurality of pilot outer clutch plates 51 and pilot inner clutch plates 52, and the armature 50 that serve as a path for the magnetic flux are the magnetic path forming members forming the magnetic path G. Each of the magnetic path forming members has coercivity unique to its material, and has magnetic hysteresis in which the magnetic susceptibility is affected not only by the intensity of the magnetic field at the point in time, but also by the magnetization process in the past.

The plurality of pilot outer clutch plates 51 and the plurality of pilot inner clutch plates 52 are disc-shaped members made of a magnetic material such as iron, and are arranged alternately in the axial direction between the armature 50 and the rear housing 22. Each of the pilot outer clutch plates 51 and the pilot inner clutch plates 52 has a plurality of arc-shaped slits axially aligned with the second annular member 222 of the rear housing 22 to restrict short-circuiting of magnetic flux.

Each pilot outer clutch plate 51 has, at its outer peripheral edge, a plurality of engagement projections 511 that engage with the outer spline projections 211 of the front housing 21. Each pilot inner clutch plate 52 has, at its inner peripheral edge, a plurality of engagement projections 521 that engage with the spline projection 411 of the pilot cam 41. As in the case of the main clutch 3, friction sliding between the pilot outer clutch plates 51 and the pilot inner clutch plates 52 is facilitated by lubricating oil.

The armature 50 is an annular member made of a magnetic material such as iron. The armature 50 has, at its outer peripheral portion, a plurality of engagement projections 501 that engage with the outer spline projections 211 of the front housing 21. Thus, the armature 50 is allowed to move in the axial direction relative to the front housing 21 while being restricted from rotating relative to the front housing 21.

The electromagnetic clutch mechanism 5 attracts the armature 50 toward the yoke 54 by the magnetic force generated by energization of the electromagnetic coil 53, and generates a frictional force between the pilot outer clutch plates 51 and the pilot inner clutch plates 52 by thus moving the armature 50. The pilot outer clutch plates 51 and the pilot inner clutch plates 52 are pressed toward the rear housing 22 by the armature 50 to come into frictional contact with each other.

In the driving force transmission device 2, when the electromagnetic clutch mechanism 5 is actuated, a rotational force corresponding to the current supplied to the electromagnetic coil 53 is transmitted to the pilot cam 41. Then, the pilot cam 41 rotates relative to the main cam 42, and the cam balls 43 roll in the cam grooves 41a and 422a. When the cam balls 43 roll, a thrust force for pressing the main clutch 3 is generated in the main cam 42, so that a frictional force is generated between the plurality of main outer clutch plates 31 and the plurality of main inner clutch plates 32. By this frictional force, the driving force transmission device 2 transmits a driving force between the housing 20 and the inner shaft 23, and outputs a driving force to the pinion gear shaft 150.

As illustrated in FIG. 1, the control device 7 includes a control unit 70 having a CPU, a storage unit 74 having a non-volatile memory such as EEPROM and flash memory, and a switching power supply unit 75 that switches a voltage of a DC power supply such as a battery and supplies a coil current to the electromagnetic coil 53 of the driving force transmission device 2. The switching power supply unit 75 includes a switching device such as a transistor. The switching power supply unit 75 switches a DC voltage based on a pulse width modulation (PWM) signal that is output from the control unit 70, and generates a coil current. When the CPU executes a program stored in the storage unit 74, the control unit 70 serves as a torque command value calculator 71, a current command value calculator 72, and a current control unit 73.

The storage unit 74 stores programs, I-T characteristic information, and a hysteresis value. In the present embodiment, I-T characteristic information and a hysteresis value measured after assembly of each driving force transmission device 2 in the production line are stored in the storage unit 74. The I-T characteristic information and the hysteresis value are measured in the final process, namely, a measurement process, in the production line of the driving force transmission device 2, and are stored in the control device 7 to be mounted on a four-wheel drive vehicle 1 together with the driving force transmission device 2 subjected to the measurement. However, the present invention is not limited thereto. For example, typical I-T characteristic information and hysteresis value may be stored in the storage unit 74.

The I-T characteristic information is characteristic information indicating the relationship between the current value and the torque transmitted between the housing 20 and the inner shaft 23 when the coil current supplied to the electromagnetic coil 53 is gradually increased. The hysteresis value represents the difference between the value of the current required to transmit a predetermined torque between the housing 20 and the inner shaft 23 when the coil current supplied to the electromagnetic coil 53 is gradually increased and the value of the current required to transmit the predetermined torque between the housing 20 and the inner shaft 23 when the coil current is gradually reduced.

Even when manufactured in the same production line, the driving force transmission devices 2 differ from one another in I-T characteristic information and hysteresis value, due to dimensional deviation or assembly deviation of the magnetic path forming members, variation in material characteristics, or the like. In the present embodiment, in order to reduce variation in the driving force transmitted by the driving force transmission device 2 due to dimensional deviation or assembly deviation, variation in material characteristics, or the like, and to improve the accuracy of the driving force transmitted, the control device 7 stores the individually measured I-T characteristic information and hysteresis value, and controls the driving force transmission device 2 based on these pieces of information.

The control unit 70 serves as the torque command value calculator 71 to calculate a torque command value representing the target value of the driving force (torque) to be transmitted from the housing 20 to the inner shaft 23, every predetermined calculation period (for example, 5 ms). The control unit 70 serves also as the current command value calculator 72 to calculate a current command value representing the target value of the current to be supplied to the electromagnetic coil 53, based on the torque command value and the hysteresis value stored in the storage unit 74. The control unit 70 servers also as the current control unit 73 to perform current feedback control so as to supply a current corresponding to the current command value to the electromagnetic coil 53.

Figure 3:
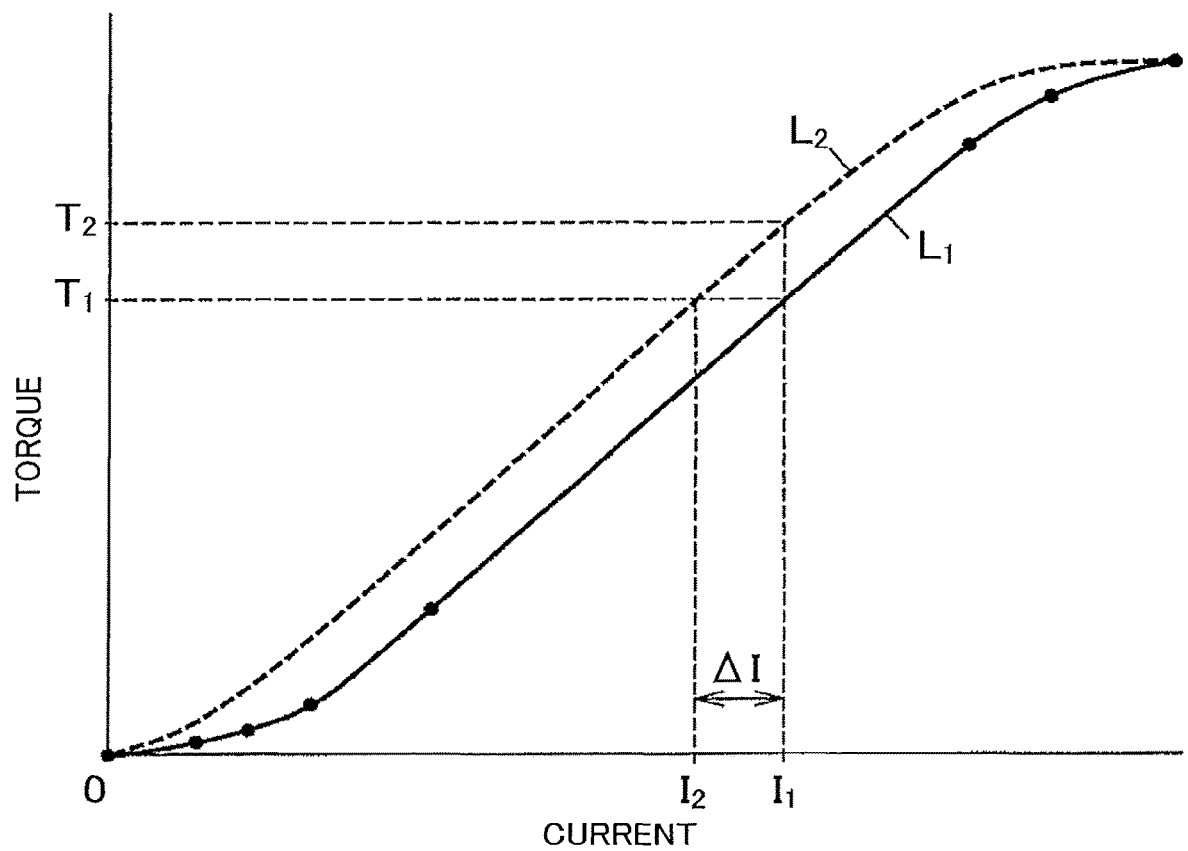
FIG. 3 is a graph illustrating an example of the relationship between current supplied to an electromagnetic coil and torque.

FIG. 3 is a graph illustrating an example of the relationship between current and torque transmitted between the housing 20 and the inner shaft 23 when the current supplied to the electromagnetic coil 53 is gradually increased from zero to the rated current and then is gradually reduced from the rated current to zero. In this graph, a characteristic line $L_1$ representing the torque when the current is gradually increased is indicated by a continuous line, whereas a characteristic line $L_2$ representing the torque when the current is gradually reduced is indicated by a dashed line.

The storage unit 74 stores, as the I-T characteristic information, the relationship between the current and the torque transmitted when the energization current to the electromagnetic coil 53 is gradually increased. The relationship between the current and the torque transmitted is stored as the coordinate values of a plurality of coordinate points indicated by the black dots on the graph of FIG. 3. The control unit 70 serves as the current command value calculator 72 to perform linear interpolation between the coordinate points and calculate the current command value using the obtained results. The reason why the relationship between the current and the torque transmitted when the energization current to the electromagnetic coil 53 is gradually increased is stored as the I-T characteristic information, and is used for calculating the current command value is because the accuracy of the driving force when increasing the driving force (torque) transmitted by the driving force transmission device 2 is especially important in securing the travel stability of the four-wheel drive vehicle 1.

As illustrated in FIG. 3, when the current supplied to the electromagnetic coil 53 gradually increases, the torque transmitted between the housing 20 and the inner shaft 23 is less than when the current gradually decreases. In other words, the current required to transmit a desired torque is greater when the current increases than when the current decreases. The relationship between the current applied to the electromagnetic coil 53 and the torque transmitted between the housing 20 and the inner shaft 23 is linear in the intermediate range other than the range near a current of zero and the range near the rated current. When the driving force transmission device 2 is mounted on the four-wheel drive vehicle 1, the driving force transmission device 2 is mostly used in this intermediate range.

In the intermediate range, upon transmitting a predetermined torque of a torque value $T_1$ in FIG. 3 from the housing 20 to the inner shaft 23, the value of the current that needs to be supplied to the electromagnetic coil 53 is $I_1$ when the current increases, and $I_2$ when the current decreases. A hysteresis current amount $\Delta I (= I_1 - I_2)$ representing the difference between $I_1$ and $I_2$ is substantially constant in the intermediate range. The storage unit 74 stores the value indicating the magnitude of the hysteresis current amount $\Delta I$ as the hysteresis value.

The control unit 70 serves as the current command value calculator 72 to calculate the current command value based on the I-T characteristic information when the torque command value increases, and calculate the current command value by subtracting a hysteresis correction value corresponding to the hysteresis value from the value obtained by referring to the I-T characteristic information when the torque command value decreases. The hysteresis correction value is, for example, the hysteresis current amount $\Delta I$. However, the hysteresis correction value may be obtained by multiplying the hysteresis value by a coefficient specified based on the estimated temperature of lubricating oil, the relative rotational speed between the housing 20 and the inner shaft 23, or the like.

Thus, a desired torque is transmitted from the housing 20 to the inner shaft 23 even when the torque command value decreases. That is, in the case where the hysteresis current amount $\Delta I$ is not considered, if a current of a current value $I_1$ is supplied to the electromagnetic coil 53 when the torque command value decreases, a torque of $T_2$ greater than $T_1$ illustrated in FIG. 3 is transmitted from the housing 20 to the inner shaft 23. However, when the hysteresis current amount $\Delta I$ is considered and thus the current command value is calculated by subtracting the hysteresis correction value from the value obtained by referring to the I-T characteristic information, it is possible to restrict such an excessive torque from being transmitted.

The energization current to the electromagnetic coil 53 not only increases monotonously from zero to the vicinity of the rated current and decreases monotonously from the vicinity of the rated current to zero, but also, in some cases, stops increasing and starts decreasing, or stops decreasing and starts increasing, in the intermediate range. In such cases, a desired torque is not transmitted between the housing 20 and the inner shaft 23 by simply subtracting the hysteresis correction value. For example, in the case where the value of the current supplied to the electromagnetic coil 53 increases from zero to $I_1$ and then starts decreasing, if a current $I_2$ obtained by subtracting the hysteresis current amount $\Delta I$ from $I_1$ is supplied, a torque smaller than the desired torque is transmitted because the magnetic path forming members are not fully magnetized. In the case where the value of the current supplied to the electromagnetic coil 53 decreases from the vicinity of the rated current to $I_2$ and then starts increasing, if the current $I_1$ is supplied, a torque greater than the desired torque is transmitted because the magnetic path forming members are magnetized.

In view of the above, in the present embodiment, the control unit 70 serves as the current command value calculator 72 to execute the following calculation processes A to D in a transition period after a transition is made from a torque increase state in which the torque command value increases with time to a torque decrease state in which the torque command value decreases with time.

The calculation process A is a process of storing the current command value upon a transition from the torque increase state to the torque decrease state as a decrease start current value, and is more specifically a process of storing the current command value calculated in the calculation period immediately before a transition from the torque increase state to the torque decrease state as a decrease start current value in the storage unit 74.

The calculation process B is a process of calculating a reference current command value corresponding to the torque command value, by referring to the I-T characteristic information. For example, if the torque command value is $T_1$ in FIG. 3, the reference current command value is $I_1$. In the calculation process B, the reference current command value may be calculated by performing a correction process based on the estimated temperature of lubricating oil or the relative rotational speed between the housing 20 and the inner shaft 23, on the value obtained based on the torque command value by referring to the I-T characteristic information.

The calculation process C is a process of calculating a correction coefficient based on a current decrease amount (=decrease start current value−reference current command value) representing the difference between the decrease start current value stored in the calculation process A and the reference current command value calculated in the calculation process B. The correction coefficient is a positive coefficient having a value that increases as the current decrease amount increases, and as the relative rotational speed between the housing 20 and the inner shaft 23 decreases. The correction coefficient is determined based on, for example, a map stored in the storage unit 74. Alternatively, the correction coefficient may be calculated by a function that uses the current decrease amount and the relative rotational speed between the housing 20 and the inner shaft 23 as the arguments, and returns a value that increases as the current decrease amount increases and as the relative rotational speed decreases.

The calculation process D is a process of calculating a subtraction correction value (=hysteresis value×correction coefficient) by multiplying the hysteresis value stored in the storage unit 74 by the correction coefficient calculated in the calculation process C, and calculating a current command value (=decrease start current value−current decrease amount−subtraction correction value) by subtracting the current decrease amount and the subtraction correction value from the decrease start current value.

Of these calculation processes A to D, the calculation process A is executed only once when a transition is made from the torque increase state to the torque decrease state, whereas the calculation processes B to D are executed every calculation period. In this manner, the control unit 70 serves as the current command value calculator 72 to, in the transition period after a transition from the torque increase state to the torque decrease state, execute a process that calculates the reference current command value based on the torque command value by referring to the I-T characteristic information; calculates the correction coefficient based on the current decrease amount representing the difference between the decrease start current value and the reference current command value; calculates the subtraction correction value by multiplying the hysteresis value by the correction coefficient; and calculates the current command value by subtracting the current decrease amount and the subtraction correction value from the decrease start current value, while increasing the correction coefficient as the current decrease amount increases.

Also, the control unit 70 serves as the current command value calculator 72 to determine whether to execute the calculation processes B to D, that is, whether to continue the process for the transition period, in every calculation period. This determination may be made by, for example, determining whether the current decrease amount is less than or equal to a predetermined value, or whether the correction coefficient is less than or equal to a predetermined value. That is, when the current decrease amount exceeds a predetermined value, or when the correction coefficient exceeds a predetermined value, the process for the transition period is ended. If the torque decrease state still continues after that, the current command value is calculated by subtracting the hysteresis correction value from the value obtained by referring to the I-T characteristic information.

Figure 4:
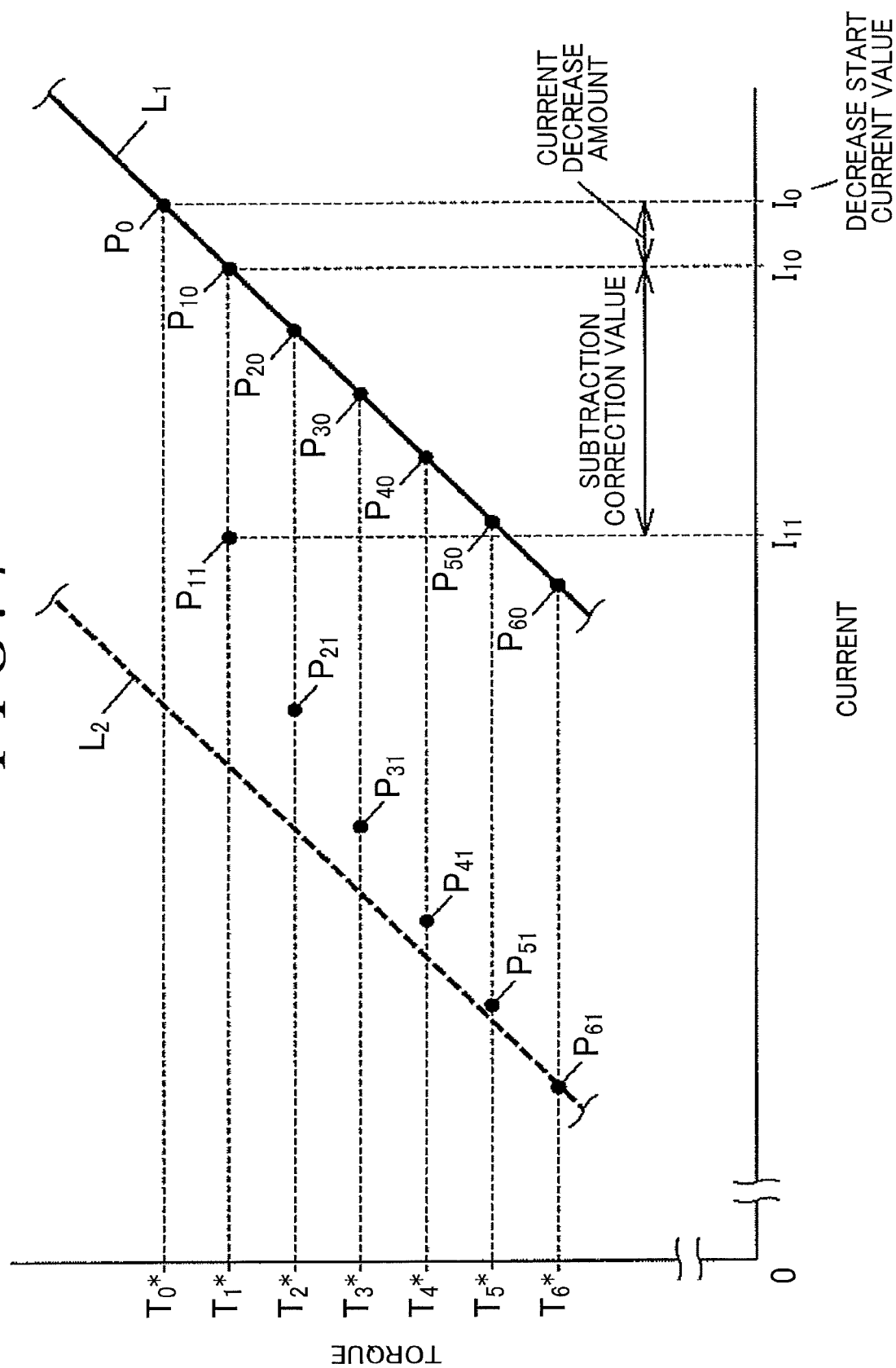
FIG. 4 is a graph illustrating a specific example of calculation processes in a transition period after a transition from a torque increase state to a torque decrease state.

FIG. 4 is a partially enlarged graph of FIG. 3, illustrating a specific example of the calculation processes A to D in a transition period after a transition from the torque increase state to the torque decrease state. FIG. 4 illustrates an example in which the torque command value decreases gradually from $T_1^*$ to $T_6^*$ over the calculation periods, after increasing from zero to $T_0^*$. A coordinate point $P_0$ is the point on a characteristic line $L_1$ corresponding to the torque command value $T_0^*$ when the torque command value stops increasing and starts decreasing. A current value $I_0$ is a decrease start current value obtained based on $T_0^*$ by referring to the I-T characteristic information.

A coordinate point $P_{10}$ is the point on the characteristic line $L_1$ corresponding to the torque command value $T_1^*$ in the calculation period immediately after the torque command value stops increasing and starts decreasing. The difference between a current value $I_{10}$ corresponding to the coordinate point $P_{10}$ and the current value $I_0$ is the current decrease amount in that calculation period. A current value $I_{11}$ is the value calculated by subtracting the subtraction correction value obtained in the calculation process D from the current value $I_{10}$, and is the current command value in that calculation period. A coordinate point $P_{11}$ is the point having a coordinate value of $T_1^*$ and $I_{11}$. In this manner, the current command value can be calculated by subtracting the current decrease amount and the subtraction correction value from the decrease start current value ($I_0$).

In FIG. 4, the coordinate points on the characteristic line $L_1$ corresponding to the torque command values $T_2^*$ to $T_6^*$ are indicated by $P_{20}$ to $P_{60}$, and the coordinate points that are offset from these coordinate points in accordance with the subtraction correction values for the respective calculation periods are indicated by $P_{21}$ to $P_{61}$. In these calculation periods, the current command value can be calculated by the same procedure as that described above. Although the subtraction correction value gradually increases as the torque command value decreases, the increase gradually slows down. When the current decrease amount in the calculation period in which the torque command value has reached $T_6^*$ exceeds a predetermined value, the process for the transition period is ended. Although the coordinate point gradually comes closer to the characteristic line $L_2$ as the coordinate point shifts from $P_{11}$ to $P_{61}$ over the calculation periods, the coordinate point does not cross over the characteristic line $L_2$ to the left side of the graph (the side opposite to the characteristic line $L_1$).

In the present embodiment, the control unit 70 serves as the current command value calculator 72 to execute the following calculation processes E to H in a transition period after a transition is made from a torque decrease state in which the torque command value decreases with time to a torque increase state in which the torque command value increases with time.

The calculation process E is a process of storing the current command value upon a transition from the torque decrease state to the torque increase state as an increase start current value, and is more specifically a process of storing the current command value calculated in the calculation period immediately before a transition from the torque decrease state to the torque increase state as an increase start current value in the storage unit 74.

The calculation process F is a process of calculating a reference current command value corresponding to the torque command value, by referring to the I-T characteristic information. For example, if the torque command value is $T_1$ in FIG. 3, the reference current command value is $I_1$.

The calculation process G is a process of calculating a correction coefficient based on a current increase amount (=increase start current value−reference current command value) representing the difference between the increase start current value stored in the calculation process F and the reference current command value calculated in the calculation process F. The correction coefficient is a positive coefficient having a value that increases as the current increase amount increases, and as the relative rotational speed between the housing 20 and the inner shaft 23 decreases. The correction coefficient is determined based on, for example, a map stored in the storage unit 74. Alternatively, the correction coefficient may be calculated by a function that uses the current increase amount and the relative rotational speed between the housing 20 and the inner shaft 23 as the arguments, and returns a value that increases as the current increase amount increases and as the relative rotational speed decreases.

The calculation process H is a process of calculating an addition correction value (=hysteresis value×correction coefficient) by multiplying the hysteresis value stored in the storage unit 74 by the correction coefficient calculated in the calculation process G, and calculating a current command value (=increase start current value+current increase amount+addition correction value) by adding the current increase amount and the addition correction value to the increase start current value.

Of these calculation processes E to H, the calculation process E is executed only once when a transition is made from the torque decrease state to the torque increase state, whereas the calculation processes F to H are executed every calculation period. In this manner, the control unit 70 serves as the current command value calculator 72 to, in the transition period after a transition from the torque decrease state to the torque increase state, execute a process that calculates the reference current command value based on the torque command value by referring to the I-T characteristic information; calculates the correction coefficient based on the current increase amount representing the difference between the increase start current value, which is the current command value upon the transition from the torque decrease state to the torque increase state, and the reference current command value; calculates the addition correction value by multiplying the hysteresis value by the correction coefficient; and calculates the current command value by adding the current increase amount and the addition correction value to the increase start current value, while increasing the correction coefficient as the current increase amount increases.

Also, the control unit 70 serves as the current command value calculator 72 to determine whether to execute the calculation processes F to H, that is, whether to continue the process for the transition period, in every calculation period. This determination may be made by, for example, determining whether the current increase amount is less than or equal to a predetermined value, or whether the correction coefficient is less than or equal to a predetermined value. That is, when the current increase amount exceeds a predetermined value, or when the correction coefficient exceeds a predetermined value, the process for the transition period is ended. If the torque increase state still continues after that, the current command value is calculated based on the value obtained by referring to the I-T characteristic information.

Figure 5:
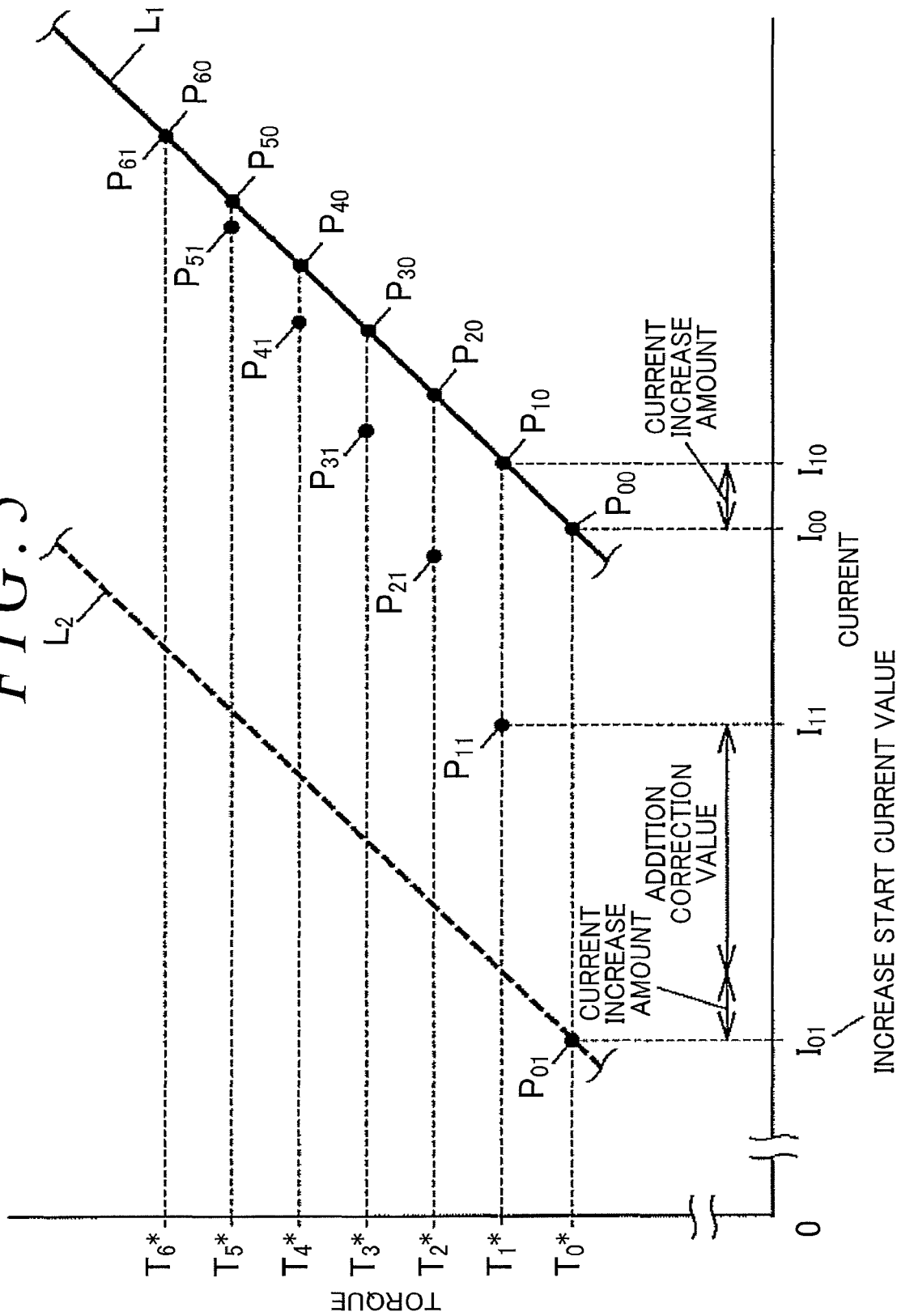
FIG. 5 is a graph illustrating a specific example of calculation processes in a transition period after a transition from a torque decrease state to a torque increase state.

FIG. 5 is a partially enlarged graph of FIG. 3, illustrating a specific example of the calculation processes E to H in a transition period after a transition from the torque decrease state to the torque increase state. FIG. 5 illustrates an example in which the torque command value increases gradually from $T_1^*$ to $T_6^*$ over the calculation periods, after decreasing from the maximum value to $T_0^*$. A coordinate point $P_{01}$ is the point on a characteristic line $L_2$ corresponding to the torque command value $T_0^*$ when the torque command value stops decreasing and starts increasing. A current value $I_{01}$ corresponding to the coordinate point $P_{01}$ is an increase start current value obtained based on $T_0^*$ by referring to the I-T characteristic information and the hysteresis correction value. In other words, the current value $I_{01}$ is the current command value in the calculation period immediately before the torque command value stops decreasing and starts increasing. A coordinate point $P_{00}$ is the point on the characteristic line $L_1$ corresponding to the torque command value $T_0^*$, and the current value corresponding to the coordinate point $P_{00}$ is a current value $I_{00}$.

A coordinate point $P_{10}$ is the point on the characteristic line $L_1$ corresponding to the torque command value $T_1^*$ in the calculation period immediately after the torque command value stops decreasing and starts increasing. The difference between a current value $I_{10}$ corresponding to the coordinate point $P_{10}$ and the current value $I_{00}$ is the current increase amount in that calculation period. The current command value is calculated by adding the current increase amount and the addition correction value, which is calculated by multiplying the hysteresis value by the correction coefficient obtained based on the current increase amount, to the increase start current value $I_{01}$. In the calculation period in which the torque command value is $T_1^*$, the current command value is $I_{11}$ corresponding to the coordinate point $P_{11}$.

In FIG. 5, the coordinate points on the characteristic line $L_1$ corresponding to the torque command values $T_2^*$ to $T_6^*$ are indicated by $P_{20}$ to $P_{60}$, and the coordinate points each having a torque command value and a current command value in the corresponding calculation period as its coordinate value are indicated by $P_{21}$ to $P_{61}$. In these calculation periods, the current command value can be calculated by the same procedure as that described above. Although the addition correction value gradually increases as the torque command value increases, the increase gradually slows down. When the current increase amount in the calculation period in which the torque command value has reached $T_6^*$ exceeds a predetermined value, the process for the transition period is ended. Although the coordinate point gradually comes closer to the characteristic line $L_1$ as the coordinate point shifts from $P_{11}$ to $P_{61}$ over the calculation periods, the coordinate point does not cross over the characteristic line $L_1$ to the right side of the graph (the side opposite to the characteristic line $L_2$).

Figure 6:
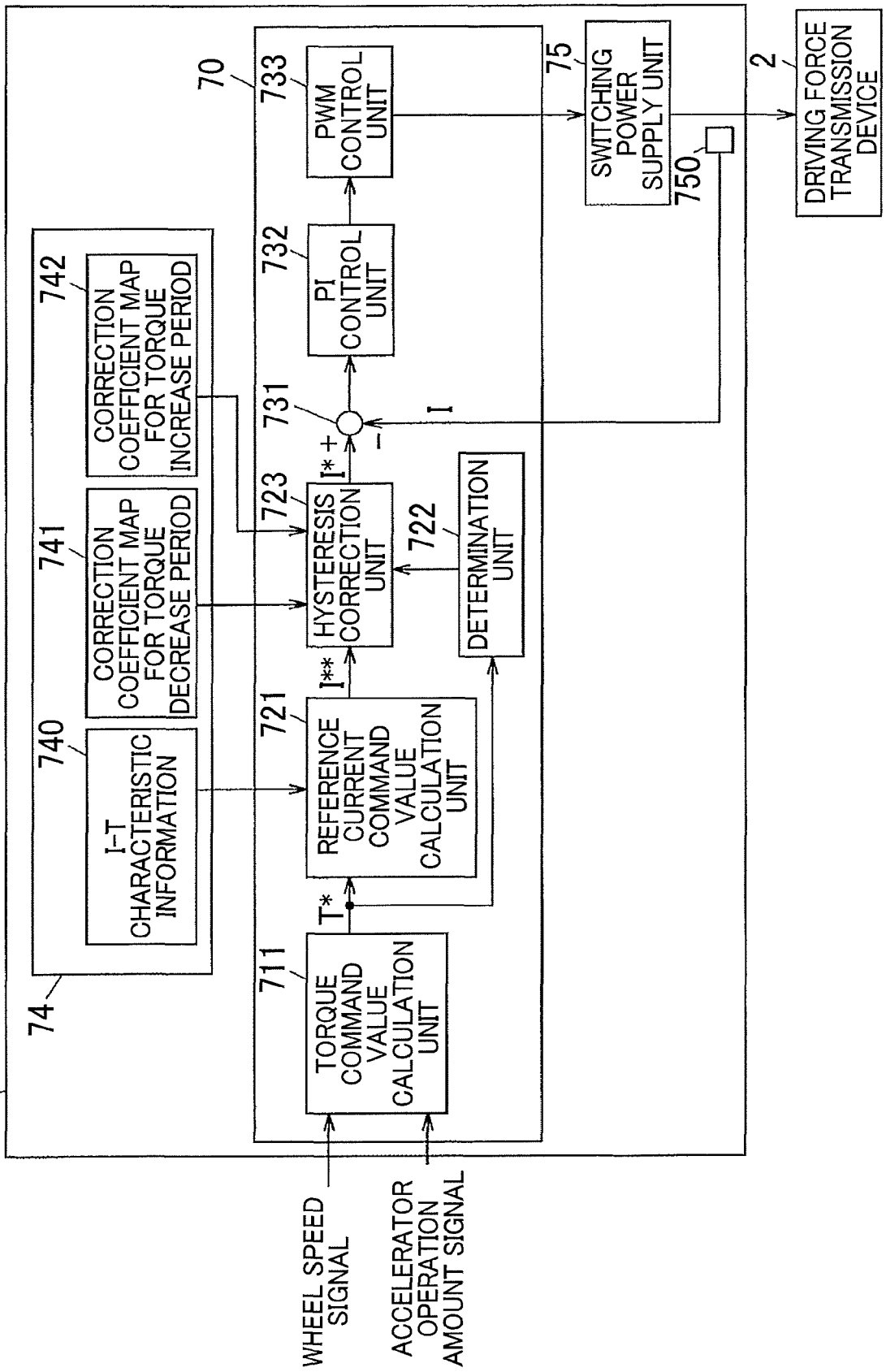
FIG. 6 is a control block diagram illustrating an example of the control configuration of the control device.

FIG. 6 is a control block diagram illustrating an example of the control configuration of the control device 7. The control unit 70 executes each process in the control block every predetermined calculation period.

The control unit 70 causes a torque command value calculation unit 711 to calculate a torque command value T* representing the target value of the torque to be transmitted from the housing 20 to the inner shaft 23, based on wheel speed signals of the right and left front wheels 182 and 181 and the right and left rear wheels 192 and 191 detected by the wheel speed sensors 101 to 104, and an accelerator operation amount signal detected by the accelerator pedal sensor 105. For example, the torque command value calculation unit 711 sets the torque command value T* to a greater value when the difference between the average rotational speed of the right and left front wheels 182 and 181 and the average rotational speed of the right and left rear wheels 192 and 191 is greater, or when the operation amount of the accelerator pedal 110 is greater.

The control unit 70 causes a reference current command value calculation unit 721 to calculate a reference current command value I** corresponding to the torque command value T*, by referring to the I-T characteristic information 740 stored in the storage unit 74 in accordance with the torque command value T*. Further, the control unit 70 causes a determination unit 722 to determine which of the torque increase state and the torque decrease state is established, based on a comparison with the torque command value T* in the previous calculation period. Further, the control unit 70 causes a hysteresis correction unit 723 to correct the reference current command value I**, based on the determination result of the determination unit 722.

The process performed by the hysteresis correction unit 723 is: a process of calculating a current command value I* by executing the calculation processes A to D if the process is performed in a transition period after a transition from the torque increase state to the torque decrease state; a process of calculating the current command value I* by executing the calculation processes E to H if the process is performed in a transition period after a transition from the torque decrease state to the torque increase state; and a process of calculating the current command value I* by subtracting the hysteresis correction value corresponding to the hysteresis value from the value obtained by referring to the I-T characteristic information if the process is performed when the torque decrease state continues in a period other than the transition period after a transition to the torque decrease state. If the process is performed when the torque increase state continues in a period other than the transition period after a transition to the torque increase state, the reference current command value I** is specified as the current command value I*.

The hysteresis correction unit 723 refers to a correction coefficient map 741 for a torque decrease period stored in the storage unit 74 when executing the calculation process C, and refers to a correction coefficient map 742 for a torque increase period stored in the storage unit 74 when executing the calculation process G. In the correction coefficient map 741 for a torque decrease period, the correction coefficient corresponding to the current decrease amount and the relative rotational speed between the housing 20 and the inner shaft 23 is defined. In the correction coefficient map 742 for a torque increase period, the correction coefficient corresponding to the current increase amount and the relative rotational speed between the housing 20 and the inner shaft 23 is defined. Instead of referring to the correction coefficient map 741 for a torque decrease period, the correction coefficient may be calculated by a function that uses the current decrease amount and the relative rotational speed between the housing 20 and the inner shaft 23 as the arguments. Similarly, instead of referring to the correction coefficient map 742 for a torque increase period, the correction coefficient may be calculated by a function that uses the current increase amount and the relative rotational speed between the housing 20 and the inner shaft 23 as the arguments.

The control unit 70 causes a deviation calculation unit 731 to calculate a deviation between the current command value I* and an actual current value I, which is the value of the coil current detected by a current sensor 750. Further, the control unit 70 causes a proportional-integral (PI) control unit 732 to perform a PI operation on the deviation calculated by the deviation calculation unit 731, calculate the duty ratio of a PWM signal to be output to the switching power supply unit 75 so as to bring the actual current value I closer to the current command value I*, and perform current feedback control. Further, the control unit 70 causes a PWM control unit 733 to generate a PWM signal for turning ON and OFF the switching device of the switching power supply unit 75 based on the duty ratio calculated by the PI control unit 732, and output the PWM signal to the switching power supply unit 75. The switching power supply unit 75 supplies a coil current corresponding to the duty ratio to the electromagnetic coil 53 of the driving force transmission device 2, so that a driving force is transmitted by the driving force transmission device 2.

In the control blocks illustrated in FIG. 6, the process executed by the torque command value calculation unit 711 is the process executed by the control unit 70 serving as the torque command value calculator 71. The processes executed by the reference current command value calculation unit 721, the determination unit 722, and the hysteresis correction unit 723 are the processes executed by the control unit 70 serving as the current command value calculator 72. The processes executed by the deviation calculation unit 731, the PI control unit 732, and the PWM control unit 733 are the processes executed by the control unit 70 serving as the current control unit 73.

According to the present embodiment described above, it is possible to reduce variation in the rotational force transmitted to the pilot cam 41 by the electromagnetic clutch mechanism 5 due to the effects of the magnetic hysteresis of the magnetic path forming members forming the magnetic path G during energization of the electromagnetic coil 53, and to improve the accuracy of the driving force transmitted by the driving force transmission device 2. Further, the control device 7 stores I-T characteristic information and a hysteresis value measured after assembly of the driving force transmission device 2, and controls the driving force transmission device 2 based on these pieces of information. Therefore, it is possible to reduce variation in the driving force due to dimensional deviation or assembly deviation, variation in material characteristics, or the like, and to further improve the accuracy of the driving force transmitted by driving force transmission device 2.

What is clamed is:

1. A driving force transmission control apparatus comprising:
    a driving force transmission device that includes an electromagnetic clutch mechanism and transmits a driving force between an input-side rotary member and an output-side rotary member by actuating the electromagnetic clutch mechanism, the electromagnetic clutch mechanism being configured to attract an armature toward a yoke by a magnetic force generated by energization of an electromagnetic coil held by the yoke and generate a frictional force between a plurality of clutch plates by moving the armature; and
    a control device that controls the driving force transmission device;
    wherein the control device includes
        a storage unit that stores a hysteresis value representing a difference between a current value required to transmit a predetermined driving force between the rotary members when an energization current to the electromagnetic coil is gradually increased and a current value required to transmit the predetermined driving force between the rotary members when the energization current is gradually reduced,
        a torque command value calculator that calculates a torque command value representing a target value of a driving force to be transmitted from the input-side rotary member to the output-side rotary member,
        a current command value calculator that calculates a current command value representing a target value of a current to be supplied to the electromagnetic coil, based on the torque command value and the hysteresis value, and
        a current control unit that performs current feedback control to supply a current corresponding to the current command value to the electromagnetic coil.

2. The driving force transmission control apparatus according to claim 1, wherein:
    the storage unit stores characteristic information representing a relationship between a current value and a torque transmitted between the rotary members when the energization current to the electromagnetic coil is gradually increased; and
    the current command value calculator calculates the current command value based on the characteristic information when the torque command value increases, and calculates the current command value by subtracting a hysteresis correction value corresponding to the hysteresis value from a value obtained by referring to the characteristic information when the torque command value decreases.

3. The driving force transmission control apparatus according to claim 2, wherein in a transition period after a transition from an increase state in which the torque command value increases with time to a decrease state in which the torque command value decreases with time, the current command value calculator calculates a reference current command value based on the torque command value by referring to the characteristic information, calculates a correction coefficient based on a current decrease amount representing a difference between a decrease start current value and the reference current command value, the decrease start current value being a current command value upon the transition from the increase state to the decrease state, calculates a subtraction correction value by multiplying the hysteresis value by the correction coefficient, and calculates the current command value by subtracting the current decrease amount and the subtraction correction value from the decrease start current value, while increasing the correction coefficient as the current decrease amount increases.

4. The driving force transmission control apparatus according to claim 3, wherein in a transition period after a transition from a decrease state in which the torque command value decreases with time to an increase state in which the torque command value increases with time, the current command value calculator calculates a reference current command value based on the torque command value by referring to the characteristic information, calculates a correction coefficient based on a current increase amount representing a difference between an increase start current value and the reference current command value, the increase start current value being a current command value upon the transition from the decrease state to the increase state, calculates an addition correction value by multiplying the hysteresis value by the correction coefficient, and calculates the current command value by adding the current increase amount and the addition correction value to the increase start current value, while increasing the correction coefficient as the current increase amount increases.

5. The driving force transmission control apparatus according to claim 2, wherein in a transition period after a transition from a decrease state in which the torque command value decreases with time to an increase state in which the torque command value increases with time, the current command value calculator calculates a reference current command value based on the torque command value by referring to the characteristic information, calculates a correction coefficient based on a current increase amount representing a difference between an increase start current value and the reference current command value, the increase start current value being a current command value upon the transition from the decrease state to the increase state, calculates an addition correction value by multiplying the hysteresis value by the correction coefficient, and calculates the current command value by adding the current increase amount and the addition correction value to the increase start current value, while increasing the correction coefficient as the current increase amount increases.

* * * * *